United States Patent
Savaglio et al.

(10) Patent No.: US 8,600,010 B2
(45) Date of Patent: *Dec. 3, 2013

(54) METHOD OF PROVIDING 911 SERVICE TO A PRIVATE BRANCH EXCHANGE

(75) Inventors: John Joseph Savaglio, Oak Lawn, IL (US); Richard Bruce Fowler, Naperville, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 253 days.

This patent is subject to a terminal disclaimer.

(21) Appl. No.: 13/149,499

(22) Filed: May 31, 2011

(65) Prior Publication Data

US 2011/0228912 A1  Sep. 22, 2011

Related U.S. Application Data

(63) Continuation of application No. 12/251,238, filed on Oct. 14, 2008, now Pat. No. 7,974,389, which is a continuation of application No. 11/037,524, filed on Jan. 18, 2005, now Pat. No. 7,436,938, which is a continuation of application No. 10/635,132, filed on Aug. 6, 2003, now Pat. No. 6,950,499, which is a continuation of application No. 10/278,602, filed on Oct. 23, 2002, now Pat. No. 6,650,733, which is a continuation of application No. 10/093,749, filed on Mar. 8, 2002, now Pat. No. 6,501,831, which is a continuation of application No. 09/642,430, filed on Aug. 21, 2000, now Pat. No. 6,415,019.

(51) Int. Cl.
*H04M 11/00* (2006.01)

(52) U.S. Cl.
USPC .......................................................... 379/45

(58) Field of Classification Search
USPC ................................. 379/45, 37–40
See application file for complete search history.

(56) References Cited

U.S. PATENT DOCUMENTS

| | | |
|---|---|---|
| 4,310,726 A | 1/1982 | Asmuth |
| 4,488,004 A | 12/1984 | Bogart et al. |
| 4,611,096 A | 9/1986 | Asmuth et al. |
| 5,161,180 A | 11/1992 | Chavous |
| 5,235,630 A | 8/1993 | Moody et al. |
| 5,339,351 A | 8/1994 | Hoskinson et al. |
| 5,347,567 A | 9/1994 | Moody et al. |

(Continued)

FOREIGN PATENT DOCUMENTS

| | | |
|---|---|---|
| EP | 0553754 | 8/1993 |
| JP | 62116056 | 5/1987 |

(Continued)

OTHER PUBLICATIONS

Advisory Action, issued in U.S. Appl. No. 11/037,524, mailed Dec. 6, 2005, 3 pages.

(Continued)

*Primary Examiner* — Stella Woo
(74) *Attorney, Agent, or Firm* — Hanley, Flight & Zimmerman, LLC

(57) ABSTRACT

A method of providing 911 service to a private branch exchange, includes grouping a plurality of private telephone numbers into a set. An outgoing telephone line for a 911 call is assigned to the set. A location information for the outgoing telephone line is input into a location database.

20 Claims, 4 Drawing Sheets

(56) References Cited

U.S. PATENT DOCUMENTS

| | | |
|---|---|---|
| 5,347,568 A | 9/1994 | Moody et al. |
| 5,422,943 A | 6/1995 | Cooney et al. |
| 5,579,368 A | 11/1996 | van Berkum |
| 5,646,985 A | 7/1997 | Andruska et al. |
| 5,818,921 A | 10/1998 | Vander Meiden et al. |
| 5,974,133 A | 10/1999 | Fleischer, III et al. |
| 6,243,442 B1 | 6/2001 | Tanaka et al. |
| 6,266,397 B1 | 7/2001 | Stoner |
| 6,415,019 B1 | 7/2002 | Savaglio et al. |
| 6,501,831 B2 | 12/2002 | Savaglio et al. |
| 6,567,514 B2 | 5/2003 | Fleischer, III et al. |
| 6,650,733 B2 | 11/2003 | Savaglio et al. |
| 6,711,247 B1 | 3/2004 | Needham et al. |
| 6,804,329 B2 | 10/2004 | Geck et al. |
| 6,854,094 B2 | 2/2005 | Inui et al. |
| 6,950,499 B2 | 9/2005 | Savaglio et al. |
| 7,116,775 B2 | 10/2006 | Lee |
| 7,436,938 B2 * | 10/2008 | Savaglio et al. ............ 379/45 |
| 7,974,389 B2 * | 7/2011 | Savaglio et al. ............ 379/45 |

FOREIGN PATENT DOCUMENTS

| | | |
|---|---|---|
| JP | 3106194 | 5/1991 |
| JP | 6217043 | 8/1994 |
| JP | 20000069512 | 3/2000 |
| JP | 2001320749 | 11/2001 |

OTHER PUBLICATIONS

Office Action, issued in U.S. Appl. No. 11/037,524, mailed Jan. 11, 2006, 7 pages.

Office Action, issued in U.S. Appl. No. 11/037,524, mailed Sep. 28, 2007, 5 pages.

Office Action, issued in U.S. Appl. No. 11/037,524, mailed Jan. 2, 2008, 5 pages.

Notice of Allowance, issued in U.S. Appl. No. 11/037,524, mailed Jun. 27, 2008, 4 pages.

Office Action, issued in U.S. Appl. No. 10/635,132, mailed Jul. 15, 2004, 5 pages.

Notice of Allowance, issued in U.S. Appl. No. 10/635,132, mailed Nov. 24, 2004, 3 pages.

Notice of Allowance, issued in U.S. Appl. No. 09/642,430, mailed Feb. 1, 2002, 3 pages.

Notice of Allowance issued in U.S. Appl. No. 10/278,602, mailed Jul. 10, 2003, 4 pages.

Office Action, issued in U.S. Appl. No. 10/278,602, mailed May 27, 2003, 7 pages.

Office Action, issued in U.S. Appl. No. 10/278,602, mailed Apr. 8, 2003, 4 pages.

Notice of Allowance, issued in U.S. Appl. No. 10/093,749, mailed Aug. 26, 2002, 4 pages.

Office Action, issued in U.S. Appl. No. 10/093,749, mailed Jun. 3, 2002, 5 pages.

Office Action, issued in U.S. Appl. No. 11/037,524, mailed Sep. 30, 2005, 6 pages.

Motorola Intelligence Everywhere, Guide to Understanding 3-1-1 Systems, Sep. 2002, 8 pages.

XTEND Communications Corp., Who Dialed 911? A look at the issues surrounding Enhanced 911, Copyright 2003 XTEND Communications Corp., 4 pages.

PBX Vulnerability Analysis, Finding Holes in Your PBX Before Someone Else Does, Special Publication 800-24, United States Department of Commerce, National Institute of Standards and Technology, Aug. 2000, 66 pages.

Notice of Allowance, issued in U.S. Appl. No. 12/251,238, mailed Apr. 18, 2011, 5 pages.

Office Action, issued in U.S. Appl. No. 12/251,238, mailed Jan. 5, 2011, 6 pages.

* cited by examiner

METHOD OF PROVIDING 911 SERVICE TO A PRIVATE BRANCH EXCHANGE

RELATED APPLICATIONS

This patent arises from a continuation of U.S. application Ser. No. 12/251,238, now U.S. Pat. No. 7,974,389, filed Oct. 14, 2008, which is a continuation of U.S. application Ser. No. 11/037,524, filed Jan. 18, 2005, now U.S. Pat. No. 7,436,938, which is a continuation of U.S. application Ser. No. 10/635,132, filed Aug. 6, 2003, now U.S. Pat. No. 6,950,499, which is a continuation of U.S. application Ser. No. 10/278,602, filed Oct. 23, 2002, now U.S. Pat. No. 6,650,733, which is a continuation of U.S. application Ser. No. 10/093,749, filed Mar. 8, 2002, now U.S. Pat. No. 6,501,831, which is a continuation of U.S. application Ser. No. 09/642,430, filed Aug. 21, 2000, now U.S. Pat. No. 6,415,019 which are hereby incorporated herein by reference in their entireties.

FIELD OF THE DISCLOSURE

The present invention relates to generally to the field of 911 emergency service systems and more particularly to a method of providing 911 service to a private branch exchange.

BACKGROUND

A Public Safety Answering Point (PSAP) uses an automatic location identification (ALI) information provided with the automatic number identification (ANI) to determine the location of a 911 telephone call. Unfortunately, when a 911 call is placed from a business having a PBX (Private Branch Exchange), the PSAP only receives the billing address of the business. For large businesses having multiple locations, this does not provide any useful information. Some PBX providers allow the owners to enter in correct location information for all their lines. Unfortunately, this is time consuming and therefor rarely is done.

Thus there exists a need for a method of providing 911 service to a private telephone numbering system that is easy to setup.

DETAILED DESCRIPTION OF THE DRAWINGS

A method of providing 911 service to a private branch exchange, includes grouping a plurality of private telephone numbers into a set. An outgoing telephone line for a 911 call is assigned to the set. A location information for the outgoing telephone line is input into a location database (E911 database). By grouping the telephone lines significantly less information has to be input into the location database. The groups are selected to be telephone lines in a set geographic area. For instance all the telephones on the third floor of a small building might be grouped together. This provides emergency personnel with plenty of information to locate the emergency.

Figure 1:
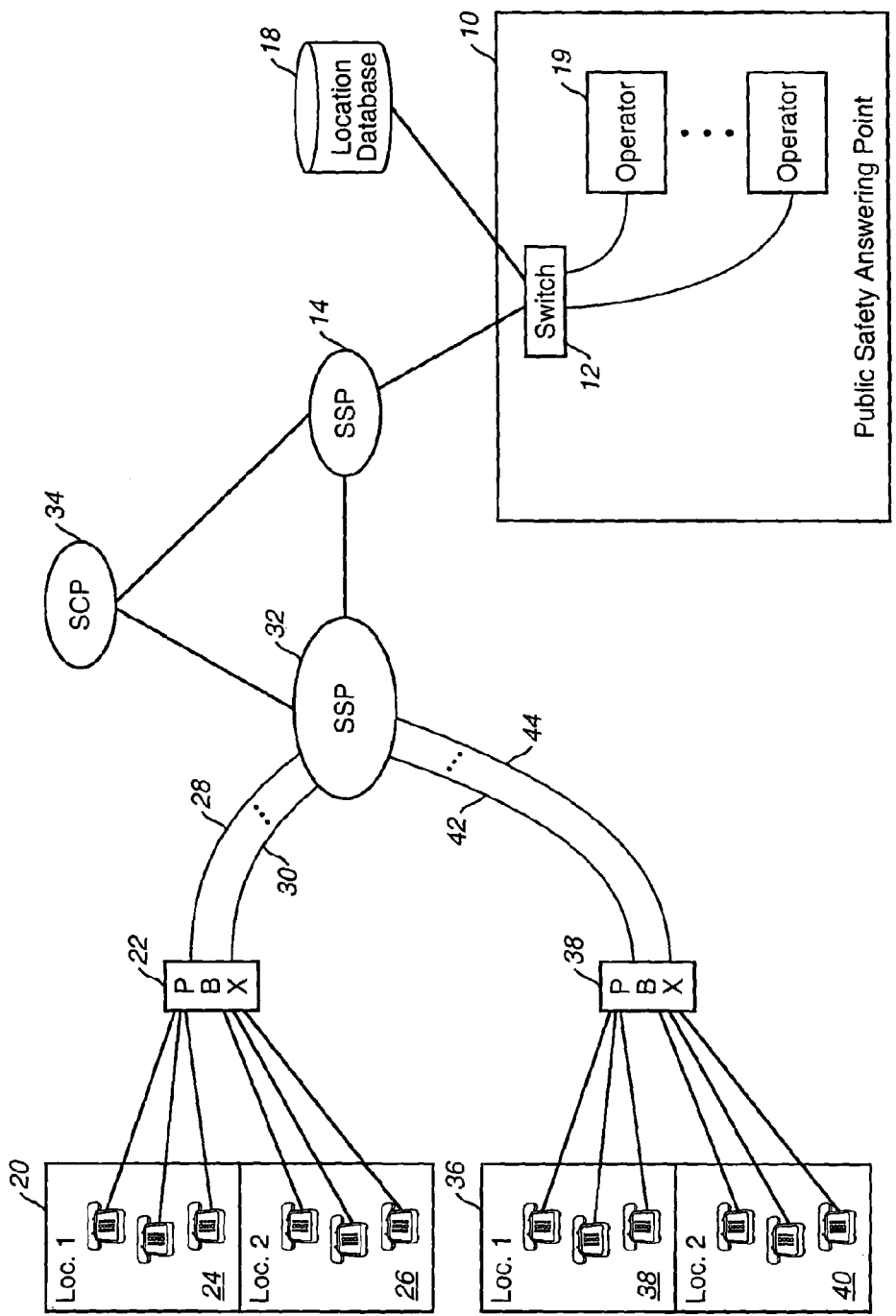
FIG. 1 is a block diagram of public safety answering service for a private telephone numbering system in accordance with one embodiment of the invention.

FIG. 1 is a block diagram of public safety answering service for a private branch exchange in accordance with one embodiment of the invention. A public safety answering point (PSAP) 10 includes a switch 12 connected to a SSP (Service Switching Point) 14. The switch 12 triggers on incoming call and forms a location query. The location query is set to a location database (E911 database) 16. The call and location information are forwarded to one of a plurality of operators 19.

A company 20 using a PBX 22 groups private telephone lines according to their location. This company 20 has two locations 24, 26. Any 911 call from the first location 24 is routed over a predetermined public telephone line 28. Any 911 call from the second location 26 is routed over a predetermined public telephone line 30. The PBX 22 is connected to a SSP 32. A 911 call is then sent to SSP 14 and to the PSAP 10. A SCP (Service Control Point) 34 is connected through an intelligent network to the SSPs 14, 32. The SCP 34 may provide routing information to the SSP 32 for 911 calls. A second company 36 also has a PBX 38. The company 36 also divides its telephones into two locations 38, 40. Note that any number of locations could be handled and the invention encompasses more than a single PBX. A 911 call from any of the telephones in the first location 38 are routed over a predetermined external telephone line 42. A 911 call from any of the telephones in the second location 40 are routed over a predetermined external telephone line 44.

Figure 2:
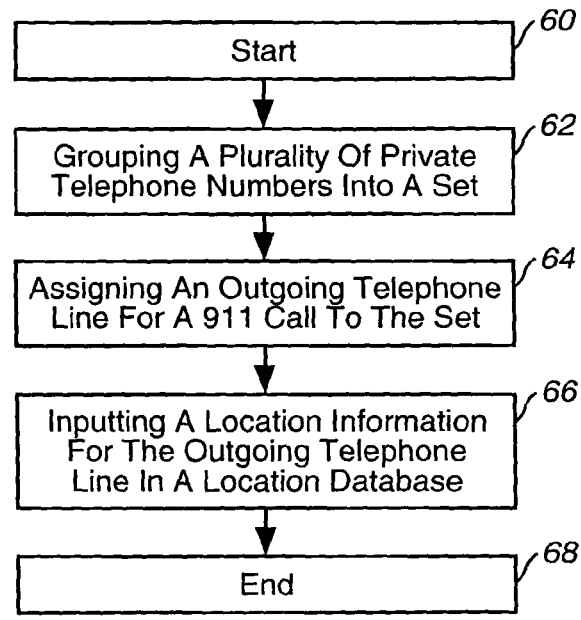
FIG. 2 is a flow chart of the steps used in a method of providing 911 service to a private branch exchange in accordance with one embodiment of the invention.

FIG. 2 is a flow chart of the steps used in a method of providing 911 service to a private branch exchange in accordance with one embodiment of the invention. The process start, step 60, by grouping a plurality of telephone numbers into a set at step 62. An outgoing telephone line for a 911 call is assigned to the set at step 64. At step 66, a location information for the outgoing telephone line is input into a location database of a telephone company which ends the process at step 68. In one embodiment, the plurality of private telephone numbers are selected by an origination location. In one embodiment a private branch exchange is programmed to select the outgoing telephone line when a 911 call is received from one of the plurality of private telephone numbers.

In one embodiment when the 911 call is dialed from one of the plurality of, private telephone numbers, the 911 call is sent out over the outgoing telephone line. The 911 call is triggered on at a service switching point. A routing query is transmitted to a switching control point (SCP). A routing instruction is received from the SCP. The 911 call is routed to a proper PSAP. A location database is queried for a location associated with a telephone number of the outgoing telephone line.

Figure 3:
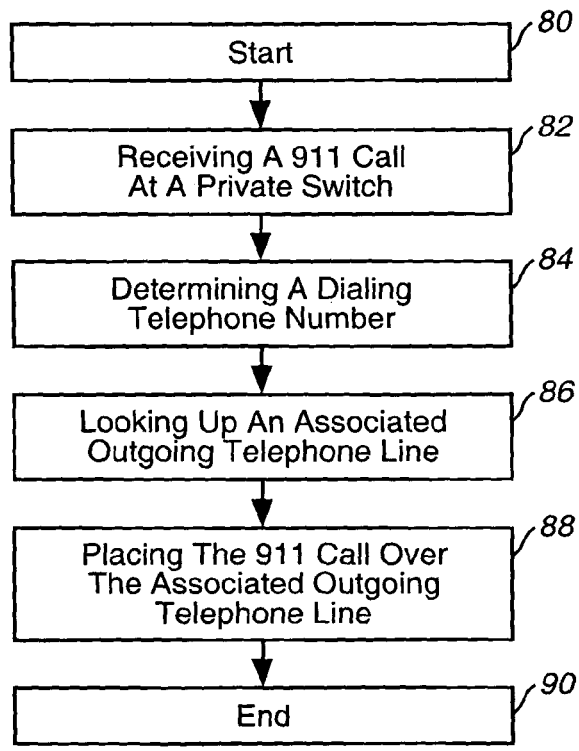
FIG. 3 is a flow chart of the steps used in a method of providing 911 service to a private branch exchange in accordance with one embodiment of the invention.

FIG. 3 is a flow chart of the steps used in a method of providing 911 service to a private branch exchange in accordance with one embodiment of the invention. The process starts, step 80, by receiving a 911 call at a private switch at step 82. In one embodiment, the private switch is a private branch exchange. A dialing telephone number is determined at step 84. An associated outgoing telephone line is looked up at step 86. At step 88, the 911 call is placed over the associated outgoing telephone line which ends the process at step 90. The 911 call is received at a service switching point (SSP). The 911 call is triggered on and the SSP sends a query to a switching control point (SCP). A response is received that includes a routing instruction. In one embodiment the response includes the number of the associated outgoing telephone line. The 911 call is routed to a public safety answering point (PSAP). A location query is sent to a location database. The 911 call is forwarded to an operator. A location information is transmitted to the operator.

In one embodiment, a first plurality of private telephone numbers are grouped into a first set. A second plurality of private telephone numbers are grouped into a second set. One of a plurality of outgoing telephone lines is assigned to the first set. A second of the plurality of outgoing telephone lines is assigned to the second set. The location database is programmed to include a location for the one of the plurality of outgoing telephone lines and a second location for the second of the plurality of outgoing telephone lines.

Figure 4:
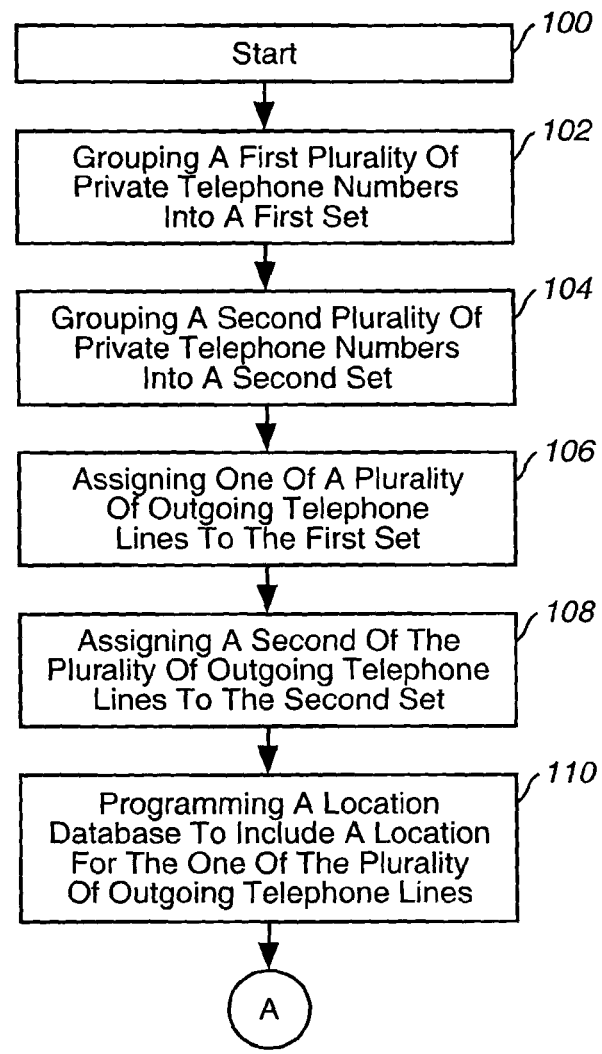
FIGS. 4 & 5 are a flow chart of the steps used in a method of providing 911 service to a private branch exchange in accordance with one embodiment of the invention.
Figure 5:
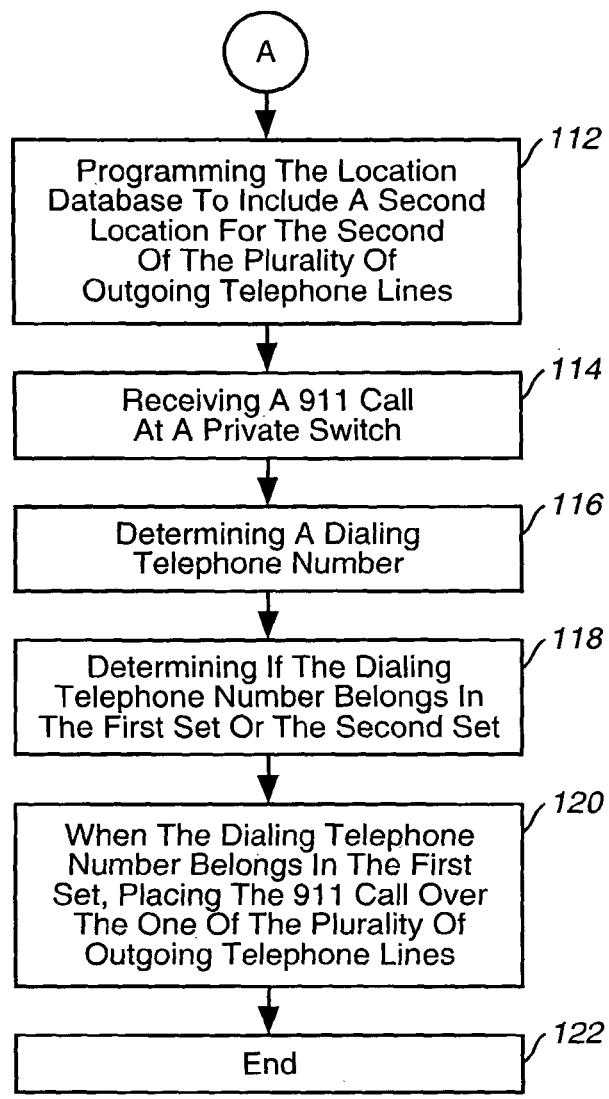

FIGS. 4 & 5 are a flow chart of the steps used in a method of providing 911 service to a private branch exchange in accordance with one embodiment of the invention. The process starts, step 100, by grouping a first plurality of private telephone numbers into a first set at step 102. A second plurality of private telephone numbers is grouped into a second set at step 104. One of a plurality of outgoing telephone lines is assigned to the first set at step 106. A second of the plurality of outgoing telephone lines is assigned to the second set at step 108. A location database is programmed to include a location for the one of the plurality of outgoing telephone lines at step 110. The location database is programmed to include a second location for the second of the plurality of outgoing telephone lines at step 112. A 911 call is received at a private switch at step 114. A dialing telephone number is determined at step 116. At step 118 it is determined if the dialing telephone number belongs in the first set or the second set. When the dialing telephone number belongs in the first set at step 120, the 911 call is placed over the one of the plurality of outgoing telephone lines which ends the process at step 122. When the dialing telephone number belongs in the second set, the 911 call is placed over the second of the plurality of outgoing telephone lines. The 911 call is received at a service switch point. The 911 call is triggered on and a query is sent to a switching control point. A response is received that includes a routing instruction. The 911 call is routed to a public safety answering point. A location query is sent to the location database. The call is forwarded to an operator. A location information is transmitted to the operator.

Thus there has been described a method of providing 911 service to a private telephone numbering system that is easy to setup.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A private branch exchange, comprising:
a memory having machine readable instructions; and
a processor which, when executing the instructions, performs operations comprising:
selecting a first outgoing telephone line for an emergency call to a public safety answering point when the emergency call is from one of a first group of numbers, wherein the first group of numbers is assigned to the first outgoing telephone line and wherein the public safety answering point identifies a first location when receiving the emergency call over the first outgoing telephone line; and
selecting a second outgoing telephone line for the emergency call when the emergency call is from one of a second group of numbers, wherein the second group of numbers is assigned to the second outgoing telephone line and wherein the public safety answering point identifies a second location when receiving the emergency call over the second outgoing telephone line.

2. The private branch exchange as defined in claim 1, wherein, when the emergency call is received from one of the numbers in the first group, the operations further comprise routing the emergency call over the first outgoing telephone line to indicate the first location for the emergency call.

3. The private branch exchange as defined in claim 1, wherein the operations further comprise determining from which of the first and second groups of numbers the emergency call is received.

4. The private branch exchange as defined in claim 1, wherein the first location is a first floor of a building and the second location is a second floor of the building, the second floor being different than the first floor.

5. The private branch exchange as defined in claim 1, wherein the first and second groups of numbers are associated with a same entity, and the first location is different from the second location.

6. The private branch exchange as defined in claim 1, wherein the first location is a first geographic area and the second location is a second geographic area, the second geographic area being different than the first geographic area.

7. The private branch exchange as defined in claim 1, wherein the first and second outgoing telephone lines are communicatively coupled to a service switching point.

8. A tangible machine readable storage device having instructions which, when executed, cause a machine to perform a method comprising:
selecting a first outgoing telephone line for an emergency call to a public safety answering point when the emergency call is from one of a first group of numbers, wherein the first group of numbers is assigned to the first outgoing telephone line and wherein the public safety answering point identifies a first location when receiving the emergency call over the first outgoing telephone line; and
selecting a second outgoing telephone line for the emergency call when the emergency call is from one of a second group of numbers, wherein the second group of numbers is assigned to the second outgoing telephone line and wherein the public safety answering point identifies a second location when receiving the emergency call over the second outgoing telephone line.

9. The storage device as defined in claim 8, wherein, when the emergency call is received from one of the numbers in the first group, the method further comprises routing the emergency call over the first outgoing telephone line to indicate the first location for the emergency call.

10. The storage device as defined in claim 8, the method further comprising determining from which of the first and second groups of numbers the emergency call is received.

11. The storage device as defined in claim 8, wherein the first location is a first floor of a building and the second location is a second floor of the building, the second floor being different than the first floor.

12. The storage device as defined in claim 8, wherein the first and second groups of numbers are associated with a same entity, and the first location is different from the second location.

13. The storage device as defined in claim 8, wherein the first location is a first geographic area and the second location is a second geographic area, the second geographic area being different than the first geographic area.

14. The storage device as defined in claim 8, wherein the first and second outgoing telephone lines are communicatively coupled to a service switching point.

15. A method, comprising:

selecting a first outgoing telephone line for an emergency call to a public safety answering point when the emergency call is from one of a first group of numbers, wherein the first group of numbers is assigned to the first outgoing telephone line and wherein the public safety answering point identifies a first location when receiving the emergency call over the first outgoing telephone line; and selecting a second outgoing telephone line for the emergency call when the emergency call is from one of a second group of numbers, wherein the second group of numbers is assigned to the second outgoing telephone line and wherein the public safety answering point identifies a second location when receiving the emergency call over the second outgoing telephone line.

16. The method as defined in claim 15, further comprising, when the emergency call is received from one of the numbers in the first group, routing the emergency call over the first outgoing telephone line to indicate the first location for the emergency call.

17. The method as defined in claim 15, further comprising determining from which of the first and second groups of numbers the emergency call is received.

18. The method as defined in claim 15, wherein the first location is a first floor of a building and the second location is a second floor of the building, the second floor being different than the first floor.

19. The method as defined in claim 15, wherein the first and second groups of numbers are associated with a same entity, and the first location is different from the second location.

20. The method as defined in claim 15, wherein the first location is a first geographic area and the second location is a second geographic area, the second geographic area being different than the first geographic area.

* * * * *